United States Patent
Bocharov et al.

(10) Patent No.: US 9,237,387 B2
(45) Date of Patent: *Jan. 12, 2016

(54) LOW LATENCY CACHEABLE MEDIA STREAMING

(75) Inventors: John A. Bocharov, Seattle, WA (US); Krishna Prakash Duggaraju, Renton, WA (US); Lin Liu, Sammamish, WA (US); Jack E. Freelander, Monroe, WA (US); Ning Lin, Redmond, WA (US); Anirban Roy, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

This patent is subject to a terminal disclaimer.

(21) Appl. No.: 12/611,133

(22) Filed: Nov. 3, 2009

(65) Prior Publication Data
US 2011/0080940 A1    Apr. 7, 2011

Related U.S. Application Data

(60) Provisional application No. 61/249,257, filed on Oct. 6, 2009.

(51) Int. Cl.
*H04N 21/472* (2011.01)
*H04N 21/845* (2011.01)
(Continued)

(52) U.S. Cl.
CPC .......... *H04N 21/8456* (2013.01); *H04L 65/605* (2013.01); *H04L 67/2804* (2013.01); *H04N 21/4331* (2013.01); *H04N 21/4348* (2013.01); *H04N 21/47202* (2013.01)

(58) Field of Classification Search
CPC ............. H04L 65/605; H04L 67/2804; H04N 21/4331; H04N 21/4348; H04N 21/47202; H04N 21/8456

USPC ........ 375/240.01–240.26; 709/231, 248, 203, 709/204; 725/115, 114, 145, 80, 81, 74, 725/144; 348/700, 468, 400, 405, 384, 419
See application file for complete search history.

(56) References Cited

U.S. PATENT DOCUMENTS 6,252,873 B1 * 6/2001 Vines ............................ 370/389
6,728,763 B1    4/2004 Chen
(Continued)

FOREIGN PATENT DOCUMENTS

| CN | 1326637 A | 12/2001 |
| CN | 1478355 A | 2/2004 |

(Continued)

OTHER PUBLICATIONS

Birney, Bill, "Streaming from a Web Server", retrieved at <<http://www.microsoft.com/windows/windowsmedia/howto/articles/webserver.aspx>>, Jun. 2003, pp. 5.
(Continued)

*Primary Examiner* — Behrooz Senfi
(74) *Attorney, Agent, or Firm* — Ben Tabor; Kate Drakos; Micky Minhas

(57) ABSTRACT

A low latency streaming system provides a stateless protocol between a client and server with reduced latency. The server embeds incremental information in media fragments that eliminates the usage of a typical control channel. In addition, the server provides uniform media fragment responses to media fragment requests, thereby allowing existing Internet cache infrastructure to cache streaming media data. Each fragment has a distinguished Uniform Resource Locator (URL) that allows the fragment to be identified and cached by both Internet cache servers and the client's browser cache. The system reduces latency using various techniques, such as sending fragments that contain less than a full group of pictures (GOP), encoding media without dependencies on subsequent frames, and by allowing clients to request subsequent frames with only information about previous frames.

20 Claims, 7 Drawing Sheets

(51) Int. Cl.
*H04N 21/433* (2011.01)
*H04N 21/434* (2011.01)
*H04L 29/06* (2006.01)
*H04L 29/08* (2006.01)

(56) References Cited

U.S. PATENT DOCUMENTS

| | | | |
|---|---|---|---|
| 7,054,911 | B1 | 5/2006 | Lango |
| 7,412,531 | B1 | 8/2008 | Lango |
| 7,617,178 | B2 * | 11/2009 | Chavez et al. ........................ 1/1 |
| 7,624,417 | B2 * | 11/2009 | Dua .............................. 725/114 |
| 7,644,108 | B1 | 1/2010 | Malmskog |
| 7,886,069 | B2 * | 2/2011 | Osborne ........................ 709/231 |
| 2002/0047899 | A1 | 4/2002 | Son |
| 2002/0071485 | A1 * | 6/2002 | Caglar et al. ............. 375/240.01 |
| 2002/0154691 | A1 | 10/2002 | Kost et al. |
| 2003/0110299 | A1 | 6/2003 | Larsson |
| 2004/0117427 | A1 | 6/2004 | Allen |
| 2004/0199565 | A1 | 10/2004 | Visharam |
| 2005/0102371 | A1 | 5/2005 | Aksu |
| 2005/0135476 | A1 | 6/2005 | Gentric et al. |
| 2005/0234892 | A1 | 10/2005 | Tamura |
| 2005/0283535 | A1 * | 12/2005 | Covell et al. .................. 709/231 |
| 2006/0041679 | A1 | 2/2006 | Feig |
| 2006/0161635 | A1 | 7/2006 | Lamkin |
| 2006/0224760 | A1 | 10/2006 | Yu |
| 2006/0245367 | A1 | 11/2006 | Jeffery |
| 2007/0083762 | A1 | 4/2007 | Martinez |
| 2007/0143807 | A1 | 6/2007 | Suneya |
| 2008/0086570 | A1 | 4/2008 | Dey |
| 2008/0133767 | A1 | 6/2008 | Birrer |
| 2008/0168516 | A1 * | 7/2008 | Flick et al. .................... 725/112 |
| 2008/0178230 | A1 * | 7/2008 | Eyal et al. ....................... 725/86 |
| 2008/0195743 | A1 | 8/2008 | Brueck |
| 2008/0235331 | A1 * | 9/2008 | Melamed et al. ............. 709/204 |
| 2008/0243996 | A1 | 10/2008 | Wu et al. |
| 2008/0307105 | A1 | 12/2008 | Sethi |
| 2009/0019176 | A1 | 1/2009 | Debrosse |
| 2009/0185074 | A1 | 7/2009 | Streijl |
| 2010/0123830 | A1 * | 5/2010 | Vunic ........................... 348/700 |
| 2010/0235528 | A1 * | 9/2010 | Bocharov et al. ............. 709/231 |

FOREIGN PATENT DOCUMENTS

| | | | |
|---|---|---|---|
| CN | 1625880 | A | 6/2005 |
| CN | 1795641 | A | 6/2006 |
| CN | 1902865 | A | 1/2007 |
| KR | 100410973 | B1 | 12/2003 |
| KR | 100859705 | B1 | 9/2008 |
| WO | 02/17644 | A1 | 2/2002 |
| WO | 2008/086313 | A1 | 7/2008 |

OTHER PUBLICATIONS

Rejaie, et al., "Proxy Caching Mechanism for Multimedia Playback Streams in the Internet", retrieved at <<http://research.cens.ucla.edu/people/estrin/resources/conferences/1999apr-Rejaie-Estrin-Proxy.pdf>>, Apr. 16, 1999, pp. 11.
Wu, et al., "Streaming Video over the Internet: Approaches and Directions", retrieved at <<http://people.cs.ubc.ca/~krasic/cpsc538a-2005/papers/wustreaming.pdf>>, Mar. 2001, pp. 282-300.
Hsueh, et al., "A Packet-Based Caching Proxy with Loss Recovery for Video Streaming", retrieved at <<http:// ieeexplore.ieee.org/stamp/stamp.jsp?tp=&arnumber=1185637&isnumber=26604>>, 2002, pp. 6.
Nelson, David, "Windows Media Server or Web Server?", retrieved at <<http://learn.iis.net/page.aspx/454/windows-media-server-or-web-server/>>, May 15, 2008, pp. 9.
"HTTP Streaming", retrieved at <<http://www.peerapp.com/Data/Files/HTTP_Video_Streaming_Solution_Brief.pdf>>, Sep. 25, 2009, pp. 1-6.
"International Search Report", Mailed Date: Jun. 20, 2011, Application No. PCT/US2010/051695, Filed Date: Oct. 6, 2010, pp. 11.

"First Office Action and Search Report Issued in Chinese Patent Application No. 201080045546.9", Mailed Date: Dec. 17, 2013, 13 Pages.
"Second Office Action Issued in Chinese Patent Application No. 201080016209.7", Mailed Date: Aug. 18, 2014, 10 Pages.
"Office Action Issued in European Patent Application No. 10822639.0", Mailed Date: Nov. 14, 2014, 5 Pages.
"Third Office Action Issued in Chinese Patent Application No. 201080045546.9", Mailed Date: Feb. 10, 2015, 6 Pages.
"Smooth Streaming Architecture | Alex Zambelli's Streaming Media Blog", Published on: Feb. 10, 2009, Available at: http://alexzambelli.com/blog/2009/02/10/smooth-streaming-architecture/.
"Fourth Office Action and Search Report Issued in Chinese Patent Application No. 201080045546.9", Mailed Date: Jun. 12, 2015, 14 Pages.
U.S. Appl. No. 12/405,220, Non-Final Rejection dated Oct. 8, 2010, 27 pages.
U.S. Appl. No. 12/405,220, Amendment dated Mar. 8, 2011, 19 pages.
U.S. Appl. No. 12/405,220, Final Rejection dated Mar. 31, 2011, 33 pages.
U.S. Appl. No. 12/405,220, Amendment dated Sep. 30, 2011, 11 pages.
U.S. Appl. No. 12/405,220, Non-Final Rejection dated Jan. 27, 2014, 25 pages.
U.S. Appl. No. 12/405,220, Amendment dated Apr. 28, 2014, 13 pages.
U.S. Appl. No. 12/405,220, Terminal Disclaimer dated Apr. 28, 2014, 5 pages.
U.S. Appl. No. 12/405,220, Notice of Allowance dated Aug. 4, 2014, 8 pages.
Chinese Patent Application No. 2010080012748.3 (Foreign counterpart application to U.S. Appl. No. 12/405,220), First Office Action dated Oct. 29, 2012, 11 pages (including English Translation).
Chinese Patent Application No. 2010080012748.3 (Foreign counterpart application to U.S. Appl. No. 12/405,220), Response to First Office Action dated Feb. 28, 2013, 14 pages (including English Translation of claims).
Chinese Patent Application No. 2010080012748.3 (Foreign counterpart application to U.S. Appl. No. 12/405,220), Second Office Action dated Jul. 11, 2013, 6 pages (including English Translation).
English translation of Abstract of CN1326637, 1 page.
English translation of Abstract of CN1902865, 1 page.
European Patent Application No. EP 10 75 3888.6 (Foreign counterpart application to U.S. Appl. No. 12/405,220), Extended European Search Report dated Nov. 16, 2012, 7 pages.
European Patent Application No. EP 10 75 3888.6 (Foreign counterpart application to U.S. Appl. No. 12/405,220), Response to Extended European Search Report dated Feb. 15, 2013, 19 pages.
European Patent Application No. EP 10 82 2639.0 (Foreign counterpart application to U.S. Appl. No. 12/611,133), Extended European Search Report dated Feb. 26, 2013, 7 pages.
European Patent Application No. EP 10 82 2639.0 (Foreign counterpart application to U.S. Appl. No. 12/611,133), Response Extended European Search Report dated Aug. 5, 2013, 14 pages.
Zambelli, Alex, Microsoft Corporation, "IIS Smooth Streaming Technical Overview", Mar. 2009, 18 pages.
Huawei Technologies Co., Ltd., "Storage for HTTP Streaming", Aug. 2009, 6 pages.
PCT Application No. PCT/US2010/026710 (Foreign counterpart application to U.S. Appl. No. 12/405,220), International Search Report mailed Sep. 27, 2010, 11 pages.
Girod, et al., "Advances in Channel-Adaptive Video Streaming", Proceedings of the 2002 International Conference on Image Processing, retrieved at <<http://www.stanford.edu/~bgirod/pdfs/GirodICIP02invited01.pdf>>, vol. 1, Sep. 2002, pp. 1-4.
Schulzrinne, et al., "Real Time Streaming Protocol (RTSP) draft-ietf-mmusic-rtsp-01.txt", Internet Draft, retrieved at <<http://tools.ietf.org/html/draft-ietf-mmusic-rtsp-01>>, Feb. 24, 2007, pp. 1-59.
Hoch, Michael., "Ramp Rate", "Simplifying the Recording and Streaming of Rich Media Presentations: A White Paper", retrieved at <<http://www.infocomm.org/cps/rde/xbcr/infocomm/Simplifying_

(56) References Cited

OTHER PUBLICATIONS the_Recording_and_Streaming_of_Rich_Media_Presentations.pdf>>, Oct. 15, 2004, pp. 1-7.
Chang, et al., "Real-Time Content-Based Adaptive Streaming of Sports Videos", Proceedings of the IEEE Workshop on Content-based Access of Image and Video Libraries, retrieved at <<http://ieeexplore.ieee.org/stamp/stamp.jsp?arnumber=990868&isnumber=21352>>, Mar. 9, 2009, pp. 139-146.
Conklin, et al., "Video Coding for Streaming Media Delivery on the Internet", IEEE Transactions on Circuits and Systems for Video Technology, retrieved at <<http://ieeexplore.ieee.org/ielx5/76/19666/00911155.pdf?arnumber=911155>>, vol. 11, No. 3, pp. 269-281.
Chinese Patent Application No. 201080012748.3 (Foreign counterpart application to U.S. Appl. No. 12/405,220), Request for Reexamination dated Sep. 17, 2014, 9 pages.
Office Action Issued in Chinese Patent Application No. 201080012748.3 (Foreign counterpart application to U.S. Appl. No. 12/405,220), Mailed Date: Jun. 13, 2014, Filed Date: Mar. 9, 2010, 11 Pages.
Chinese Patent Application No. 201080012748.3 (Foreign counterpart application to U.S. Appl. No. 12/405,220), Office Action dated Feb. 12, 2014, 8 pages (including English Translation).
Chinese Patent Application No. 201080012748.3 (Foreign counterpart application to U.S. Appl. No. 12/405,220), Amendment dated Apr. 23, 2014, 17 pages (including English summary).
Chinese Patent Application No. 2010080012748.3 (Foreign counterpart application to U.S. Appl. No. 12/405,220), Office Action dated Oct. 31, 2013, 7 pages (including English Translation).
Chinese Patent Application No. 2010080012748.3 (Foreign counterpart application to U.S. Appl. No. 12/405,220), Amendment dated Jan. 7, 2014, 5 pages (including English summary).
Chinese Patent Application No. 201080045546.9 (Foreign counterpart application to U.S. Appl. No. 12/611,133), Office Action dated Dec. 17, 2013, 13 pages (including English translation).
Chinese Patent Application No. 2010080012748.3 (Foreign counterpart application to U.S. Appl. No. 12/405,220), Response to Office Action dated Sep. 13, 2013, 12 pages (including English Translation of claims).
Chinese Patent Application No. 2010080012748.3 (Foreign counterpart application to U.S. Appl. No. 12/405,220), Notice on Reexamination dated Mar. 13, 2015, 9 pages (including English Translation).
Chinese Patent Application No. 2010080012748.3 (Foreign counterpart application to U.S. Appl. No. 12/405,220), Summary of Notice on Reexamination dated Mar. 13, 2015, 1 page.
Chinese Patent Application No. 201080045546.9 (Foreign counterpart application to U.S. Appl. No. 12/611,133), Response to Fourth Office Action, Mailed Date: Jul. 23, 2015, 17 Pages.
European Patent Application No. 1 0822639.0 (Foreign counterpart application to U.S. Appl. No. 12/611,133), Amendment dated May 12, 2015, 9 pages.
Chinese Patent Application No. 201080045546.9(Foreign counterpart application to U.S. Appl. No. 12/611,133), Notice of Allowance dated Nov. 23, 2015, 4 pages (including English Translation).

\* cited by examiner

LOW LATENCY CACHEABLE MEDIA STREAMING

CROSS-REFERENCE TO RELATED APPLICATIONS

The present application claims priority to U.S. Provisional Patent Application No. 61/249,257 entitled "LOW LATENCY CACHEABLE MEDIA STREAMING," and filed on Oct. 6, 2009, which is hereby incorporated by reference.

BACKGROUND

Streaming media is multimedia that is constantly received by, and normally presented to, an end-user (using a client) while it is being delivered by a streaming provider (using a server). One problem with existing media streaming architectures is the tight coupling between server and client. A stateful connection between client and server creates additional server overhead, because the server tracks the current state of each client. This also limits the scalability of the server. In addition, the client cannot quickly react to changing conditions, such as increased packet loss, reduced bandwidth, user requests for different content or to modify the existing content (e.g., speed up or rewind), and so forth, without first communicating with the server and waiting for the server to adapt and respond. Often, when a client reports a lower available bandwidth, the server does not adapt quickly enough, causing breaks in the media to be noticed by the user on the client as packets that exceed the available bandwidth are not received and new lower bit rate packets are not sent from the server in time. To avoid these problems, clients often buffer data, but buffering introduces latency, which for live events may be unacceptable.

In addition, the Internet contains many types of downloadable media content items, including audio, video, documents, and so forth. These content items are often very large, such as video in the hundreds of megabytes. Users often retrieve documents over the Internet using HTTP through a web browser. The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

Unfortunately, live media often cannot be cached using existing protocols, and each client requests the media from the same server or set of servers. In addition, when streaming media can be cached, it is often done by specialized cache hardware, not existing and readily available HTTP-based Internet caching infrastructure. The lack of caching limits the number of parallel viewers and requests that the servers can handle, and limits the attendance of a live event. The world is increasingly using the Internet to consume up to the minute live information, such as the record number of users that watched live events such as the opening of the 2008 Olympics via the Internet. The limitations of current technology are slowing adoption of the Internet as a medium for consuming this type of media content.

Latency between the original signal and the time the signal is reproduced at the client can also be a problem, particular where it is desirable for Internet-based streaming media to be closely synchronized with a live broadcast sent over traditional broadcast (e.g., satellite) or other systems. Streaming media passes through an encoder, one or more servers, and finally to the client. Along this path, numerous delays can occur that introduce latency. For example, the encoder may include a buffer that it fills with signal information before encoding each packet, a server protocol may call for placing information about upcoming packets in a current packet so that the server holds packets beyond an earliest time they could be sent, clients may buffer data (e.g., due to decoder settings) before playing the data back, and so forth. Each of these delays contributes to the latency between the time of a live event and when the client can view the live event.

SUMMARY

A low latency streaming system is described herein that provides a stateless protocol between the client and server with reduced latency over previous systems. The server embeds incremental information in media fragments (i.e., chunks) that eliminates the usage of a typical control channel. In addition, the server provides uniform media fragment responses to media fragment requests (i.e., clients requesting the same fragment get the same response), thereby allowing existing Internet cache infrastructure to cache streaming media data. Each fragment has a distinguished Uniform Resource Locator (URL) that allows the fragment to be identified and cached by both Internet cache servers and the client's browser cache. The system reduces latency using various techniques, such as sending fragments that contain less than a full group of pictures (GOP), encoding media without dependencies on subsequent frames, and by allowing clients to request subsequent frames with only information about previous frames. Thus, the low latency streaming system provides a more scalable streaming media server without tracking client state and with an increased likelihood that clients will receive media with lower latency from a cache server local to the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
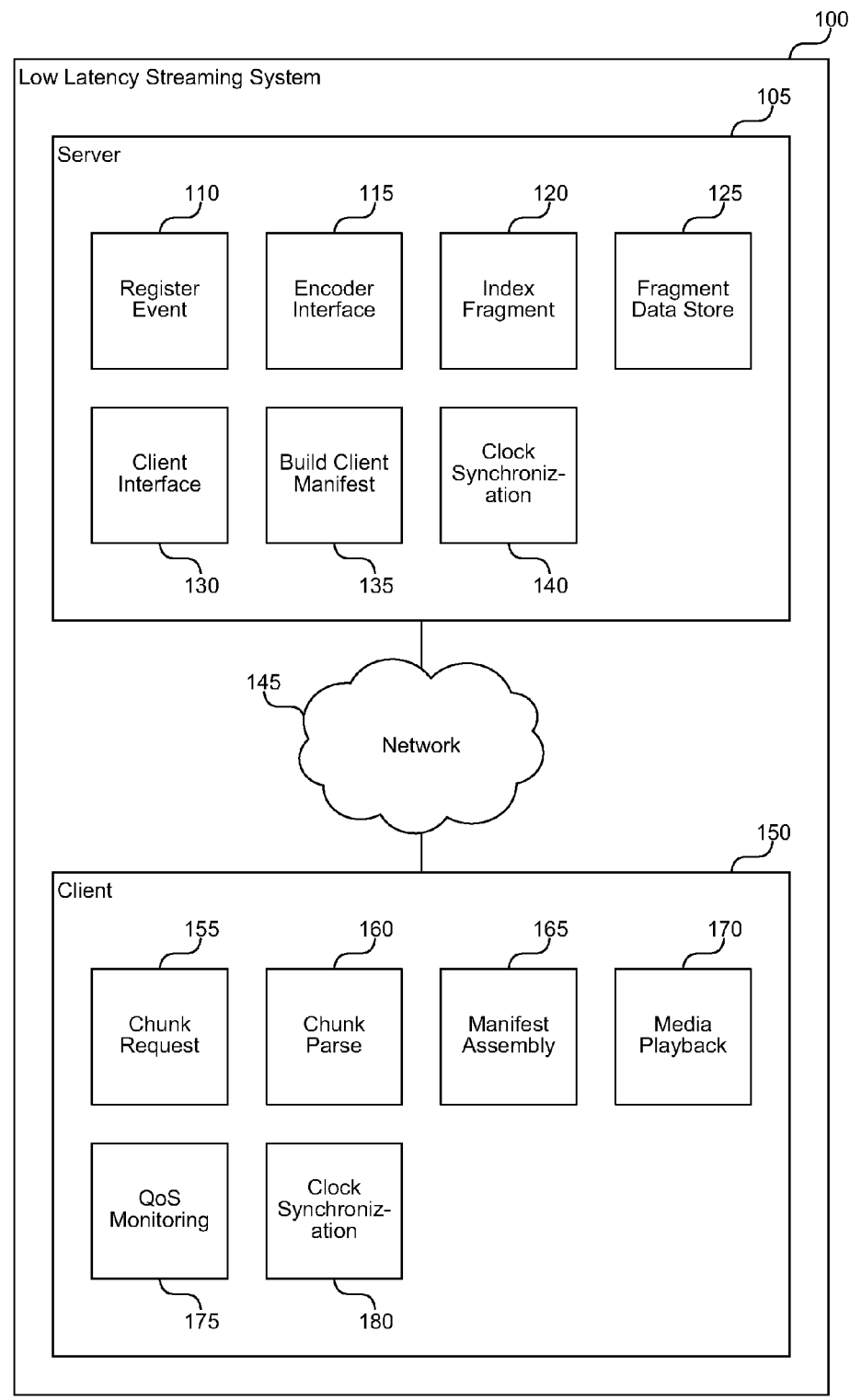
FIG. 1 is a block diagram that illustrates components of the low latency streaming system, in one embodiment.

A low latency streaming system is described herein that provides a stateless protocol between the client and server with reduced latency over previous systems. The server embeds incremental information in media fragments (i.e., chunks) that eliminates the usage of a typical control channel. In addition, the server provides uniform media fragment responses to media fragment requests (i.e., clients requesting the same fragment get the same response), thereby allowing existing Internet cache infrastructure to cache streaming media data. Each fragment has a distinguished Uniform Resource Locator (URL) that allows the fragment to be identified and cached by both Internet cache servers and the client's browser cache. Caching reduces the load on the server and allows more clients to view the same content at the same time. The low latency streaming system receives media data in fragments from one or more encoders, creates an index of each fragment, and stores the fragments.

As the event progresses, the server provides fragments requested by clients until the end of the event. Each fragment contains metadata information that describes the encodings available on the server and the encoding of the fragment in addition to the media content of the fragment for playback by the client. The server may provide fragments in multiple encodings so that, for example, the client can switch quickly to fragments of a different bit rate or playback speed based on network conditions. The server may also provide information within each fragment that allows the client to determine whether the client is requesting data too fast or too slow, so that the client can adapt its request rate to a cadence in tune with the rate at which the server is receiving encoder data. Thus, the low latency streaming system provides a more scalable streaming media server without tracking client state and with an increased likelihood that clients will receive media with lower latency from a cache server local to the client.

In some embodiments, the low latency streaming system uses a particular data transmission format between the server and client. The client requests fragments of media from a server that include a portion of the media. For example, for a 10-minute file, the client may request 2-second or smaller fragments. Note that unlike typical streaming where the server pushes data to the client, in this case the client pulls media fragments from the server. In the case of a live stream, the server may be creating the media on the fly and producing fragments to respond to client requests. Thus, the client may only be several fragments behind the server in terms of how fast the server creates fragments and how fast the client requests fragments.

Each fragment contains metadata and media content. The metadata may describe useful information about the media content, such as the bit rate at which the media content was encoded, where the media content fits into a larger media element (e.g., this fragment represents offset 1:10 in a 10 minute video clip), the codec used to encode the media content, and so forth. The client uses this information to place the fragment into a storyboard of the larger media element and to properly decode and playback the media content.

Network packet loss is inevitable. It happens on the public Internet, DSL, Cable, wireless local area network (WLAN), 3G wireless, and many other kinds of networks. The estimated packet loss rate on the Internet is 5%, and some wireless networks may have packet loss of over 10%. Reliable network transmission protocols, such as Transmission Control Protocol (TCP), will resend a packet if the transmission medium drops the packet, thus guaranteeing packet delivery. Unreliable protocols, such as Unreliable Datagram Protocol (UDP), do not guarantee packet delivery and do not resend dropped packets. Resending packets takes time and consumes additional bandwidth. Due to the real-time nature of video communication, video signals are often sent using unreliable protocols and therefore will suffer from network packet loss.

For real-time video communication, a sending endpoint sends video frames across a network to a receiving endpoint, sometimes at a rate of 20 to 30 frames per second or more. Frames are divided into packets based on the Maximum Transmission Unit (MTU) allowed by the network (e.g., 1500 bytes for Ethernet). A frame of video may be small enough to fit within one packet, or may be large enough to fill many packets. For some video compressor/decompressors (codecs), if any of the packets in a frame is dropped, then the receiving endpoint may discard the whole frame due to missing data.

In addition, codecs often use a dependency structure to reduce the amount of video data that a sending endpoint transmits over the network. For example, a frame called an intra (I) frame is encoded in full based on its contents. Subsequent frames are compressed based on a delta (difference signal) from the previous frames. These frames are often called prediction (P) frames. Some codecs introduce even more complex dependency structures. For example, the codec may occasionally send designated P frames called super-prediction (SP) frames that, as opposed to regular P-frames, do not depend on the immediately preceding P-frame or I-frame but rather on an older SP frame or I frame. The content of such SP frames typically is less correlated with the reference frame and thus carries more video data. Another type of frame is a between or bi-directional (B) frame that contains a delta from both a previous and a subsequent frame. These types of inter-frame dependencies reduce the amount of data that the sending endpoint transmits over the network, but the dependencies also exaggerate the effects of network packet loss. For example, if an I-frame is dropped, the receiving endpoint will be missing data for all subsequent P-frames that depend on the I-frame, and the user will see video artifacts until the next I-frame arrives.

A group of pictures (GOP) structure specifies the order in which intra-and inter-frames are arranged. A GOP is a group of successive pictures within a coded video stream. Each coded video stream comprises successive GOPs. From the pictures contained in the GOP, the visible frames are generated. A GOP begins with an I-frame. Afterwards several P-frames follow, in each case with some frame distance. In the remaining gaps are B-frames. The I-frames contain the full image and do not reference any additional information to reconstruct the picture. Therefore, any errors within the GOP structure are corrected by the next I-frame. B-frames within a GOP only propagate errors in H.264, where other pictures can reference B-frames in order to increase compression efficiency. The more I-frames the video stream has, the more editable it is. However, having more I-frames increases the stream size. In order to save bandwidth and disk space, videos prepared for internet broadcast often have only one I-frame per GOP. The GOP structure is often referred by two numbers, for example M=3, N=12. The first one tells the distance between two anchor frames (I or P). The second one tells the distance between two full images (I-frames): it is the GOP length. For the example M=3 N=12, the GOP structure is IBBPBBPBBPBB. Instead of the M parameter, one can use the maximal count of B-frames between two consecutive anchor frames.

In some embodiments, the low latency streaming system creates fragments that contain less than a whole GOP. For example, the system may create fragments that are one or more frames long, but less than a full GOP. In some cases, a full GOP may represent two seconds of video, and waiting to send a full GOP in a fragment can introduce two or more seconds of latency. By creating fragments with less than a full GOP, the system can manage the size of the fragments to lower the latency to a more acceptable level. For example, a 30 frame per second (fps) video sent in fragments containing three frames each will include only 1/10th of a second of latency attributable to the fragment layout.

In some embodiments, the low latency streaming system encodes GOPs without B-frames. Because B-frames include forward dependencies, the presence of B-frames in the stream causes the decoder on the client to wait for frames following the B-frame before decoding the B-frame. For example, the client may wait for a subsequent P-frame that the B-frame references, so that it can first decode the P-frame then the B-frame. This delay introduces playback latency. By eliminating B-frames from the encoded stream, the system removes latency at the decoder. B-frames are often used to reduce the bandwidth used to transmit a given stream quality. However, where bandwidth is plentiful or slightly lower quality is acceptable, encoding without B-frames can decrease latency for other acceptable trade-offs.

In some embodiments, the low latency streaming system includes a next fragment request that a client can send to a server to request a fragment that follows an identified fragment. Servers often wait to receive one or more subsequent fragments from an encoder before sending a current fragment. This allows the server to embed information about subsequent fragments (such as the relative or absolute start time of the subsequent fragments) in the metadata of the current fragment. This allows the client to directly request subsequent fragments using the embedded information. However, causing the server to hold a packet in this manner introduces unnecessary latency. By allowing the client to ask for a fragment that follows a fragment already received by the client, the low latency system allows the server to avoid holding fragments and reduces latency. The system may allow clients to request a particular server URL that identifies the next fragment request in a manner that is cacheable using typical HTTP or other protocol caching via standard Internet proxies.

FIG. 1 is a block diagram that illustrates components of the low latency streaming system, in one embodiment. The low latency streaming system 100 includes at least one server 105 and at least one client 150 connected by a network 145, such as the Internet. The server 105 includes a register event component 110, an encoder interface component 115, an index fragment component 120, a fragment data store 125, a client interface component 130, a build client manifest component 135, and a clock synchronization component 140. Each of these components is described in further detail herein.

The register event component 110 receives information about a live or other media event for which the system 100 will receive encoded media data. The information may include network address information or other identifiers for each of the encoders that will supply encoded media data to the server. The information also includes a URL to which encoders will supply encoded media data and at which clients can access the media data.

The encoder interface component 115 provides an interface between the system 100 and one or more encoders that provide the encoded media data. The encoders may push data to the system 100 using common network protocols. For example, the encoders may use an HTTP POST request to provide encoded media data to the system 100. The encoders may each use a distinguished URL that specifies the encoder that is the source of the encoded media data, which the server may match to the information received by the register event component 110 when the media event was registered.

The encoder interface component 115 may specify a particular format for received encoded media data, such as an MP4 or other media container (e.g., MKV). The MP4 container format allows multiple types of data to be associated in a single file. The individual data that makes up an MP4 container is called a box, and each box typically has a label that identifies the type of data stored in the box. Encoders may place metadata information in the boxes such as the type of encoding used to encode the encoded media data, as well as the encoded media data itself.

The system 100 may configure encoders to lower overall latency produced by the system. For example, the system 100 may configure encoders not to include B-frames in streams so that the decoder can more quickly decode frames without waiting for subsequent frames to which B-frames would refer. In addition, the system 100 may instruct encoders to produce fragments that include less than a whole GOP, so that the encoder can push fragments to the server 105 more quickly.

The index fragment component 120 creates and maintains an index table of fragments received from various encoders. Because the system 100 is receiving media fragments on an on-going basis during an event from potentially many encoders, the system 100 uses the index table to keep track of what media fragments have been received and from which encoders (or in which formats). Each encoder may use a common method for identifying media fragments (e.g., a time stamp using a synchronized clock) so that the index fragment component 120 can correlate fragments from different encoders that represent the same period in a live event. In this way, the system 100 can detect when media fragments are missing and can provide clients with manifest information about available media fragments.

The fragment data store 125 stores received media fragments and the created index table of fragments to provide to clients in response to received client requests. The fragment data store may include a database, disk drive, or other form of data storage (e.g., a Storage Area Network (SAN) or a cloud-based storage service).

The client interface component 130 receives client requests for media fragments and provides manifest data and media fragments to clients. When a client initially connects to the system 100, the client may send a request for a client manifest. The client interface component 130 invokes the build client manifest component 135 to create a manifest that includes information about the encodings available from the system 100, and fragments stored by the system 100 up to the current time based on the index table. The client can use this information either to begin requesting ongoing live fragments, or to skip backwards in time to earlier portions of a presentation. The client can use this technique, for example, if the client joins a live event that is already in progress and wants to catch up with the previous portions of the event.

The build client manifest component 135 builds a manifest to satisfy a client request that includes information about each of the encodings available from the system 100 and fragments stored by the system 100 up to the current time. The build client manifest component 135 also provides a manifest to include with each media fragment that provides information to the client about the current media fragment as well as potentially subsequent fragments. By combining the initially received manifest with subsequent manifests provided with each media fragment, the client can build an up to date manifest that includes complete information about the media event from the start up until the current time. When the media event completes, the client has a complete storyboard of the media event that the client can use for on-demand viewing of the media event.

In some embodiments, the client interface component 130 responds to client requests for available fragments without waiting for subsequent fragments from which to include information with the current fragment. The client can request subsequent fragments by referencing the current fragment. For example, if the client last requested a fragment at time 1000, and wants the subsequent fragment, the client may send a request to get the fragment following the fragment at time 1000. In this way, the server can send fragments without introducing additional latency by waiting for subsequent fragments before sending a fragment.

The clock synchronization component 140 synchronizes the clocks of the system 100, clients, and encoders. Although absolute time is not relevant to the system 100, being able to identify a particular fragment across multiple encoders and providing clients with the rate (i.e. cadence) at which to request fragments is relevant to the system 100. For example, if the client 150 requests data too quickly, the server 105 will not yet have the data and will respond with error responses (e.g., an HTTP 404 not found error response) creating many spurious requests that unnecessarily consume bandwidth. On the other hand, if the client 150 requests data too slowly, then the client 150 may not have data in time for playback, creating noticeable breaks in the media played back to the user. In addition, encoders produce media fragments in encodings that may differ dramatically and may provide no meaningful way of correlating two fragments that represent the same period of time in different encodings as well as where the fragments fit into an overall timeline of the media event. The clock synchronization component 140 provides this information by allowing the server 105, encoders, and clients to have a similar clock value at a particular time. The encoders may also mark each media fragment with the time at which the encoder created the fragment. In this way, if a client 150 requests a particular fragment, the client 150 will get a fragment representing the same period regardless of the encoding that the client 150 selects.

The client 150 includes a chunk request component 155, a chunk parsing component 160, a manifest assembly component 165, a media playback component 170, a QoS monitoring component 175, and a clock synchronization component 180. Each of these components is described in further detail herein.

Figure 2:
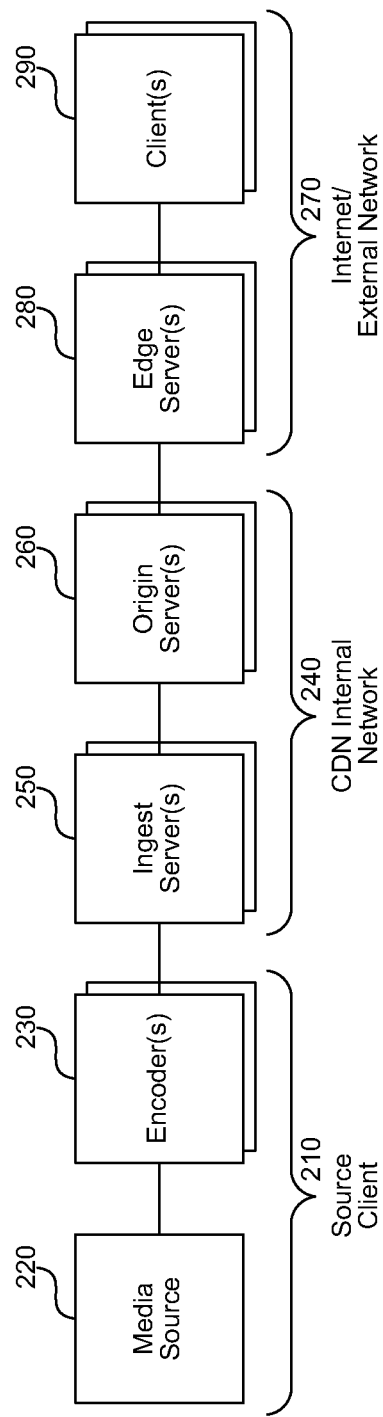
FIG. 2 is a block diagram that illustrates an operating environment of the low latency streaming system using Microsoft Windows and Microsoft Internet Information Server (IIS), in one embodiment.

The chunk request component 155 makes requests from the client for individual media chunks from the server. As shown in FIG. 2, the client's request may pass first to an edge server (e.g., an Internet cache), then to an origin server, and then to an ingest server. At each stage, if the requested data is found, then the request does not go to the next level. For example, if the edge server has the requested data, then the client receives the data from the edge server and the origin server does not receive the request. Each chunk may have a Uniform Resource Locator (URL) that individually identifies the chunk. Internet cache servers are good at caching server responses to specific URL requests (e.g., HTTP GET). Thus, when the first client calls through to the server 105 to get a chunk, the edge servers cache that chunk and subsequent clients that request the same chunk may receive the chunk from the edge server (based on the cache lifetime and server time to live (TTL) settings). The chunk request component 155 receives the chunk and passes it to the chunk parsing component 160 for interpretation. The chunk request component 1550 may request chunks by referencing a previous chunk (e.g., give me the chunk after chunk N).

The chunk parsing component 160 interprets the format of a media chunk received by the chunk request component 155 and separates the chunk into its component parts. Typically, the chunk includes a header portion containing metadata, and a data portion containing media content. The chunk parsing component provides the metadata to the manifest assembly component 165 and the media content to the media playback component 170. The media content may include mixed media types, such as video and audio data related to a presentation.

The manifest assembly component 165 builds a manifest that describes the media element to which received media content belongs. Large media files that clients download as a whole (i.e., not streamed) often include a manifest describing the whole file, the codecs and bit rates used to encode various portions of the file, markers about meaningful positions within the file, and so forth. During streaming, particularly live content, a server 105 cannot provide a complete manifest because the event is still ongoing. Thus, the server 105 provides as much of the manifest as it can through the metadata in the media chunks. The server 105 may also provide an application-programming interface (API), such as a predefined URL, for the client to request the manifest up to the current point in the media stream. This can be useful when the client 150 joins a live, streamed event after the event is already in progress. The manifest allows the client 150 to request previously streamed portions of the media element (e.g., by rewinding), and the client 150 continues to receive new portions of the manifest through the metadata of the streamed media chunks.

The manifest assembly component 165 builds a manifest similar to that available for a complete media file. Thus, as the event proceeds if the user wants to skip backwards in the media (e.g., rewind or jump to a particular position), then skip forward again, the user can do so and the client 150 uses the assembled manifest to find the appropriate chunk or chunks to playback to the user. When the user pauses, the system 100 may continue to receive media chunks (or only the metadata portion of chunks based on a distinguished request URL), so that the manifest assembly component 165 can continue to build the manifest and be ready for any user requests (e.g., skip to the current live position or play from the pause point) after the user is done pausing. The client-side assembled manifest allows the client 150 to play the media event back as on-demand content as soon as the event is over, and to skip around within the media event as it is going on.

The media playback component 170 plays back received media content using the client hardware. The media playback component 170 may invoke one or more codecs to interpret the container within which the media content is transported and to decompress or otherwise decode the media content from a compressed format to a raw format (e.g., YV12, RGBA, or PCM audio samples) ready for playback. The media playback component 170 may then provide the raw format media content to an operating system API (e.g., Microsoft DirectX) for playback on local computer system sound and video hardware, such as a display and speakers.

The server 105 can influence latency on the client 150 by the encoding used. For example, encodings that include B-frames may cause the client to buffer received data longer before playing it back. By encoding video data without B-frames, the server can cause the client to playback video with less latency.

The QoS monitoring component 175 analyzes the success of receiving packets from the server 105 and adapts the client's requests based on a set of current network and other conditions. For example, if the client 150 is routinely receiving media chunks late, then the QoS monitoring component 175 may determine that the bandwidth between the client 150 and the server 105 is inadequate for the current bit rate, and the client 150 may begin requesting media chunks at a lower bit rate. QoS monitoring may include measurement of other heuristics, such as render frame rate, window size, buffer size, frequency of rebuffering, and so forth, and then taking appropriate action. Media chunks for each bit rate may have a distinguished URL so that chunks for various bit rates are cached by Internet cache infrastructure at different URLs. Note that the server 105 does not track client 150 state and does not know what bit rate any particular client is currently playing. The server 105 can simply provide the same media element in a variety of bit rates to satisfy potential client requests under a range of conditions. In addition, the initial manifest and/or metadata that the client 150 receives may include information about the bit rates and other encoding properties available from the server 105, so that the client 150 can choose the encoding that will provide a good experience.

When switching bit rates, the client 150 simply begins requesting the new bit rate and playing back the new bit rate chunks as the client 150 receives the chunks. Unlike previous systems, the client 150 does not have to send control information to the server 105 and wait for the server 105 to adapt the stream. The client's requests may not even reach the server 105 due to a cache in between the client 150 and server 105 satisfying the request. Thus, the client 150 is much quicker to react than clients in traditional media streaming systems are, and the burden on the server 105 of having different clients connecting under various current conditions is reduced dramatically. In addition, because current conditions tend to be localized, it is likely that many clients in a particular geographic region or on a particular Internet service provider (ISP) will experience similar conditions and will request similar media encodings (e.g., bit rates). Because caches also tend to be localized, it is likely that the clients in a particular situation will find that the cache near them is "warm" with the data that they each request, so that the latency experienced by each client will be low.

The clock synchronization component 180 synchronizes the client clock with the server clock. Although absolute time is not generally relevant to the client and server, being able to identify a particular chunk and knowing the rate (i.e. cadence) at which to request chunks is relevant to the client. Clock synchronization also gives the client a common reference across many encodings. For example, the server may encode data in multiple bit rates and using multiple codecs at the same time. Each encoder may reference encoded data in a different way, but the timestamp can be set in common across all encoders. In this way, if a client requests a particular chunk, the client will get media representing the same period regardless of the encoding that the client selects.

The computing device on which the low latency streaming system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

As discussed above, the build client manifest component creates a client manifest. Following is an example of a typical client manifest.

```
<?xml version="1.0" encoding="utf-8"?>
<!--Created with Expression Encoder version 2.1.1205.0-->
<SmoothStreamingMedia MajorVersion="1" MinorVersion="0"
        Duration="6537916781" LookAheadFragmentCount="3"
        IsLive="TRUE">
    <StreamIndex Type="video" Subtype="WVC1" Chunks="327"
            Url="QualityLevels({bitrate})/Fragments(video={start
            time})">
        <QualityLevel Bitrate="1450000" FourCC="WVC1"
                Width="848" Height="480"
                CodecPrivateData="..." />
        <QualityLevel Bitrate="1050000" FourCC="WVC1"
                Width="592" Height="336" CodecPrivateData="..." />
        <c n="0" t="12345678" d="20000000" />
        <c n="1" t="32345678" d="20000000" />
        <c n="2" t="52345678" d="20000000" />
        <c n="3" t="72345678" d="20000000" />
    </StreamIndex>
</SmoothStreamingMedia>
```

The client manifest lists the decoding information as well as information for all the fragments that the server has archived so far. The total media fragment number and duration is only for the media fragments that the server has archived up until when the client makes the request (this allows the client to quickly build a seek bar). For each media fragment, "t" means the absolute timestamp. The client uses this value to compose the fragment URL (e.g., "Fragments (video={start time})). LookAheadFragmentCount indicates the targeted number of subsequent fragments that "TrackFragmentReferenceBox" is going to reference as described further herein. "IsLive" indicates whether the live broadcast is still going on.

FIG. 2 is a block diagram that illustrates an operating environment of the low latency streaming system using Microsoft Windows and Microsoft Internet Information Server (IIS), in one embodiment. The environment typically includes a source client 210, a content delivery network 240, and an external network 270. The source client is the source of the media or live event. The source client includes a media source 220 and one or more encoders 230. The media source 220 may include cameras each providing multiple camera angles, microphones capture audio, slide presentations, text (such as from a closed captioning service), images, and other types of media. The encoders 230 encode the data from the media source 220 in one or more encoding formats in parallel. For example, the encoders 230 may produce encoded media in a variety of bit rates.

The content delivery network 240, where the low latency streaming system operates, includes one or more ingest servers 250 and one or more origin servers 260. The ingest servers 250 receive encoded media in each of the encoding formats from the encoders 230 and create a manifest describing the encoded media. The ingest servers 250 may create and store the media fragments described herein or may create the fragments on the fly as they are requested. The ingest servers 250 can receive pushed data, such as via an HTTP POST, from the encoders 230, or via pull by requesting data from the encoders 230. The encoders 230 and ingest servers 250 may be connected in a variety of redundant configurations. For example, each encoder may send encoded media to each of the ingest servers 250, or only to one ingest server until a failure occurs. The origin servers 260 are the servers that respond to client requests for media fragments. The origin servers 260 may also be configured in a variety of redundant configurations.

In some embodiments, the ingest servers 250 comprise one or more servers dedicated to ingesting encoder media streams. An administrator or content author may create a publishing point that defines a URL at which clients of the ingest servers 250 can find a particular media element (e.g., a live event). For example, using IIS, the administrator may publish a URL "http://ingserver/pubpoint.isml." The publishing point is used by the encoders 230 to provide new media data to the ingest servers 250 and by the origin servers 260 to request media data from the ingest servers 250. Each encoder may use a distinguished URL to connect to the ingest servers 250 so that the ingest servers 250 can detect different encodings of the same data. For example, based on the URL in the previous example, an encoder may send an HTTP POST to provide media data to the ingest server using the URL "http://ingserver/pubpointisml/Streams(stream1)." The ingest servers 250 store the received data for later retrieval by clients of the ingest servers 250 (e.g., the origin servers 260). The POST may contain various types of media formats, such as an MP4 container. An MP4 container contains various types of information, called boxes, that are typically labeled with a four-letter code, such as "ftyp" to describe the type of encoding used and "moov" to contain audiovisual data. Whether using MP4 or other container formats, the encoder may add additional boxes or information to the stream, such as a "ManifestBox" that contains a manifest describing the media element.

When the ingest servers 250 receive a request for data, the ingest servers 250 provide the data stored earlier. The ingest servers 250 may support several types of requests, including a request for encoder stream manifest that identifies the available encoder streams and a request for data from a specific stream (including portions of the stream data). The type of request may be identified by the URL of the request. For example, when the ingest servers 250 receive the URL "http://ingserver/pubpoint.isml/StreamManifest," the ingest servers 250 return an encoder manifest that contains identifiers for each available encoder. When the ingest servers 250 receives the URL "http://ingserver/pubpoint.isml/Streams(stream1)," the ingest servers 250 send a corresponding media stream for the encoder associated with the identifier "Encoder1" in response. The response may include the MP4 data, such as the cached "ftyp," "ManifestBox," and "moov" boxes described above followed by media fragments in a FIFO buffer. The ingest servers 250 may also receive partial data requests (e.g., during failover scenarios) of the form "http://ingserver/pubpointisml/Streams(stream1)/StartTime(12345678)," that cause the ingest servers 250 to skip sending "ftyp," "ManifestBox," and "moov" boxes and to try to start from the media fragment that is closest to the specified timestamp.

The origin servers 260 receive requests for media streams from media clients and retrieve requested media streams from one or more ingest servers 250. Like the ingest servers 250, an administrator or content author registers a publishing point on the origin server, and then associates the ingest servers 250 and/or encoder URLs with the publishing point. The origin servers 260 may first request (e.g., using an HTTP GET request) a manifest from the ingest servers 250 that describes the available streams. The origin server then submits separate requests for each encoder stream to the ingest server, and the ingest server responds with the requested media stream as received from the encoder.

The origin servers 260 may separately receive manifest information about the media stream and media fragments that represent parts of a larger media element being provided by the media stream. The origin servers 260 build an index of each fragment received from each stream based on a timestamp or other identifier provided by each encoder that allows the origin servers 260 to correlate data from each encoder. The origin servers 260 may build their own MP4 container or other storage format from the received data from which to respond to media client requests. By building a file of a known format from a live event, the origin server may be able to provide a unified download of a media file quickly after the event.

When the origin servers 260 receive a media client request, the origin servers 260 generate a client manifest by appending the index that the server has built to the static stream information received from the encoder manifest(s). If there are multiple streams, then the origin servers 260 merge the stream manifests into a comprehensive client manifest. This allows the client to be selective in which encoding type the client requests without obtaining further information from the origin servers 260. The server provides the manifest to the client using a standard response type that can be cached by existing Internet infrastructure, such as an HTTP response. Because the manifest data may change over time, the server may set a short cache timeout value (e.g., time to live (TTL)) on the manifest response.

The external network 270 includes edge servers 280 and other Internet (or other network) infrastructure and clients 290. When a client makes a request for a media fragment, the client addresses the request to the origin servers 260. Because of the design of network caching, if one of the edge servers 280 contains the data, then that edge server may respond to the client without passing along the request. However, if the data is not available at the edge server, then the edge server forwards the request to one of the origin servers 260. Likewise, if one of the origin servers 260 receives a request for data that is not available, the origin server may request the data from one of the ingest servers 250.

Figure 3:
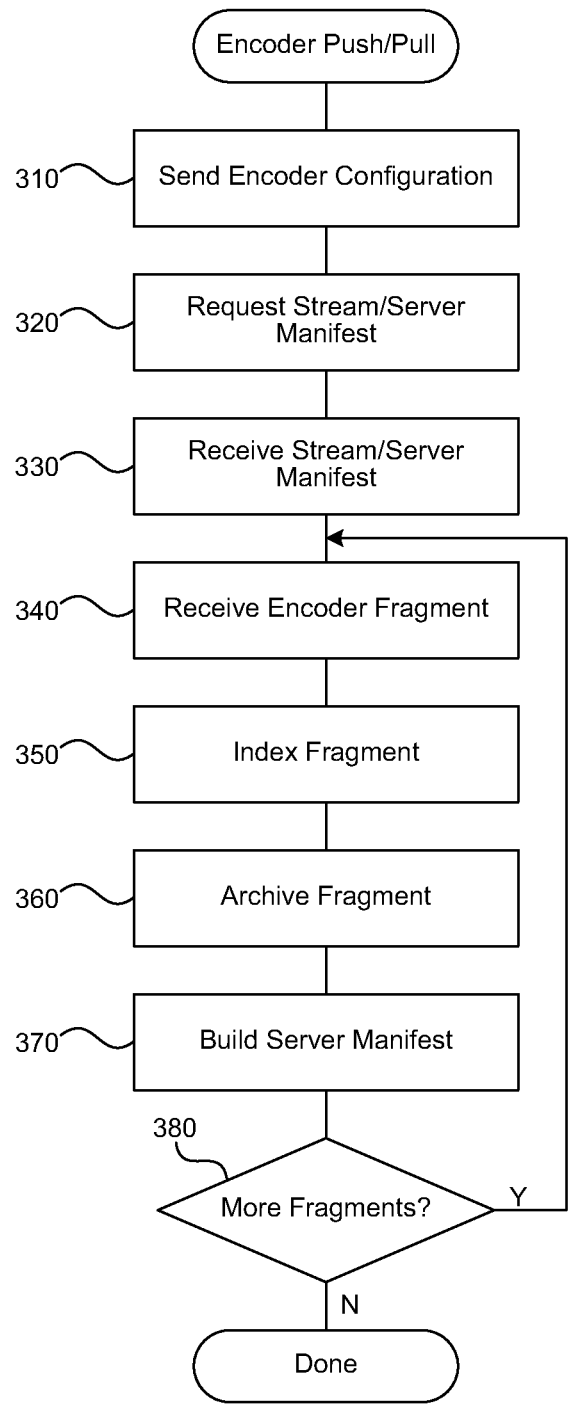
FIG. 3 is a flow diagram that illustrates the processing of the low latency stream system to receive media data from encoders at a server, in one embodiment.

FIG. 3 is a flow diagram that illustrates the processing of the low latency stream system to receive media data from encoders at a server, in one embodiment. Beginning in block 310, the system sends configuration parameters to one or more encoders. For example, the configuration parameters may instruct the encoders to encode video without using B-frames or define how many frames are placed in each fragment sent by the encoder. Continuing in block 320, the system parses the incoming stream to obtain the stream manifest, which describes all the encoder streams the system can expect, and the server manifest that describes the media data available for the stream in which it appears. The system can operate using a pull or a push model. For example, the system may send an HTTP GET request to the encoder requesting the encoder's configuration information, or the system may simply receive this information from the encoder as part of the stream.

In the "push" (e.g. encoder POST) case, both manifests are embedded at the beginning of the stream in custom boxes, so there is no request to make, and the system can parse the manifests out. In the "pull" case (e.g. server GET), the stream manifest is inapplicable (the publishing point definition contains equivalent information), and the system embeds that information as a custom box. The stream manifest is used to specify the set of streams that the server acquires from the encoder before presenting any data to downstream servers and client. Without the stream manifest, a race condition exists in which the server has acquired some but not all of the encoder streams, and a downstream server or client gets an incomplete picture. The system is "self-managing" in the sense that the server administrator does not specify what streams to expect, because each incoming encoder stream contains a stream manifest that provides this information.

Continuing in block 330, the system receives an encoder manifest from each encoder. The system merges the manifests of the encoders together and stores the merged manifest for later retrieval by clients interested in knowing the media encodings that the system can provide. In some embodiments, the server may request that the encoders produce data in accordance with specific parameters, such as encoding video data without using B-frames or including a certain number of frames in each fragment. Continuing in block 340, the system receives a media fragment from an encoder. The media fragment may include a timestamp, an identifier of the encoder that encoded the media fragment, and other information about the media fragment. An encoder identifier is not typically used because the system knows what stream the fragment came in over, and has identifying information on which encoder generated the stream beyond the stream identifier. Continuing in block 350, the system indexes the received media fragment and adds the index information to an index table maintained by the system that catalogs the available media fragments from the system. The system may use the timestamp associated with the media fragment to correlate media fragments produced in parallel by different encoders.

Continuing in block 360, the system archives the fragment by storing the fragment and index information in a data store from which the fragment and index information can later be retrieved to satisfy client requests. Continuing in block 370, the system builds a server manifest that includes information about a media event of which the media fragments are a part by adding information about the received fragment to the manifest. The server provides this manifest to clients when the clients connect to give the clients information about the then existing media fragments available from the system. When the event completes, the server manifest contains a complete description of the media event that can be provided to clients for on-demand viewing of the media event. Continuing in decision block 380, if the system expects more fragments from the encoders (e.g., the live event is still in progress), then the system loops to block 340 to receive the next encoder fragment, else the system completes.

Figure 4:
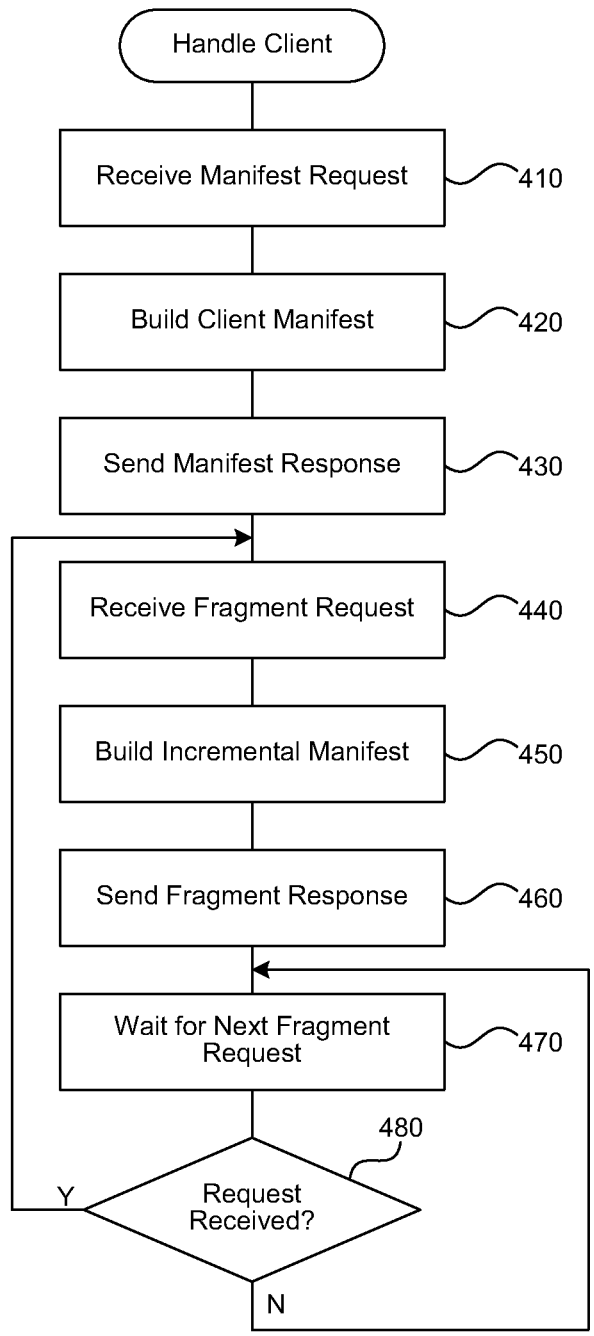
FIG. 4 is a flow diagram that illustrates the processing of the low latency streaming system to handle a client connection for streaming media at a server, in one embodiment.

FIG. 4 is a flow diagram that illustrates the processing of the low latency streaming system to handle a client connection for streaming media at a server, in one embodiment. Beginning in block 410, the system receives a manifest request from the client. For a live event, many clients may connect at the same time, but not all will connect at the start of the event. For example, if media fragments contain two seconds of data, and a client connects one minute into the event, there will already be 30 fragments available from the system. The client requests an initial manifest to determine the encodings of the event available from the system (determined by the encoders providing the system with data), and information about the then existing fragments. Note that the connection between server and client is stateless. The server does not typically dedicate any resources for a specific client. Rather, the server is listening for any incoming request, each request asks for a specific fragment or other information, and the server responds to the request and moves on to the next request without specifically tracking the state or history of any client's requests to the server.

Continuing in block 420, the system builds a manifest to satisfy the client request based on the fragments received and the encoder information received when the system initially requested encoder manifests. The client manifest includes a static portion that is a union of each of the encoder manifests that describes the available encodings, and a dynamic portion that describes media fragments received by the server from the encoders thus far. Continuing in block 430, the system provides the built client manifest to the client in response to the client request. In some embodiments, the request is a standard HTTP GET request and the response is an HTTP response (e.g., 200 OK). The system may provide a cache lifetime on the response so that subsequent client requests within a reasonable amount of time can be serviced by Internet caching infrastructure. However, because the dynamic portion of the manifest quickly becomes stale, the cache lifetime is short enough to avoid caching that would leave clients with too much stale manifest information. Based on the manifest, the client can begin requesting fragments in whichever encoding the client chooses. For example, the client may initially select a low bit rate encoding and select higher bit rate encodings for subsequent fragments until network bandwidth limits the client's ability to receive the fragments at a bit rate.

Continuing in block 440, the system receives a fragment request from a client. The client may identify that fragment by using a particular URL. The URL may identify a time of the fragment as well as an encoding. For example, the URL may be of the form "http://server/event.isml/QualityLevels (1500000)/Fragments(video=20000000)," where the QualityLevels parameter is a bit rate measured in bits per second, video is the name of the track being requested, and the value following "video=" is the time position in units of 100 nanoseconds (the scale of the unit depends on the way the presentation is encoded). In some embodiments, the client may request a fragment by referencing a previous fragment, such as using a URL like "NextFragments (video=20000000)" in place of "Fragments" in the previous URL. Continuing in block 450, the system builds an incremental manifest by retrieving manifest information from the fragment data store and local index table that describes the requested fragment. The system may also include manifest information for one or more subsequent fragments in the incremental manifest as described herein.

Continuing in block 460, the system sends a response to the client fragment request that includes the requested media fragment and the built incremental manifest. Based on the initial manifest and each incremental manifest the client can build a local manifest that encompasses information about the entire media event. The manifest allows the client to quickly skip around and play back any location within the media event. Continuing in block 470, the system waits for the next fragment request. Continuing in decision block 480 if a new fragment request is received, then the system loops to block 440 to handle the fragment request, else the system loops to block 470 to continue waiting. After block 480, these steps conclude.

Note that in the steps described herein, the smooth streaming is not aware of the state of each client and does not track state for the clients. In fact, for a particular client it is possible that the client plays the entire media event without ever talking to the system. This is possible because the client may receive each requested manifest and media fragment from cache servers distributed throughout the network. Clients request the data they want based on factors such as a desired bit rate based on client-observed network conditions, or a desired location based on user interaction with client-displayed controls (e.g., fast forward, seek, rewind, and so forth). This allows the server to focus resources on other tasks and dramatically increases scalability. For well-attended live events, this means that many more viewers can watch the event.

Figure 5:
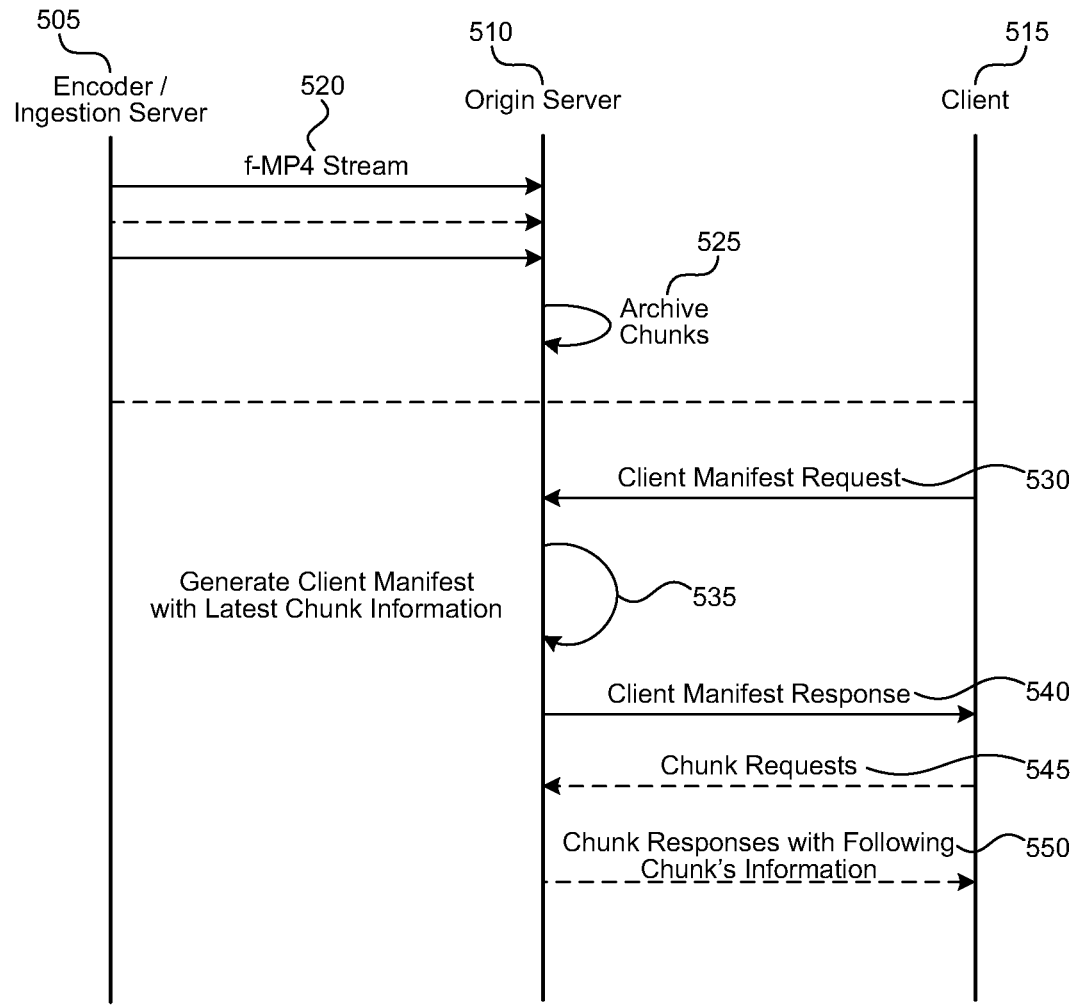
FIG. 5 is a data flow diagram that illustrates the flow of media fragments from an encoder to an origin server to a client, in one embodiment.

FIG. 5 is a data flow diagram that illustrates the flow of media fragments from an encoder to an origin server to a client, in one embodiment. The encoder 505 continuously provides media data 520 to the origin server 510 either directly or through an ingest server as described herein. The media data may include fragments of an MP4 stream based on a live event, for example. The origin server 510 archives 525 each media fragment, such as to a local data store. The origin server 510 receives a manifest request 530 from a client 515. The origin server 510 generates 535 a client manifest based on the latest media fragment information. The origin server 510 provides a client manifest response 540 to the client 515. The client 515 then sends one or more media fragment requests 545, and the origin server 510 responds 550 with the requested media fragment and potentially information about subsequent media fragments. The data flow on the left of the diagram continues for as long as the media event is taking place and the encoder 505 is providing new media data. The data flow on the right of the diagram continues for as long as clients 515 are requesting media fragments, which may occur during the media event and after the event as clients request on-demand viewing of the media event.

Figure 6:
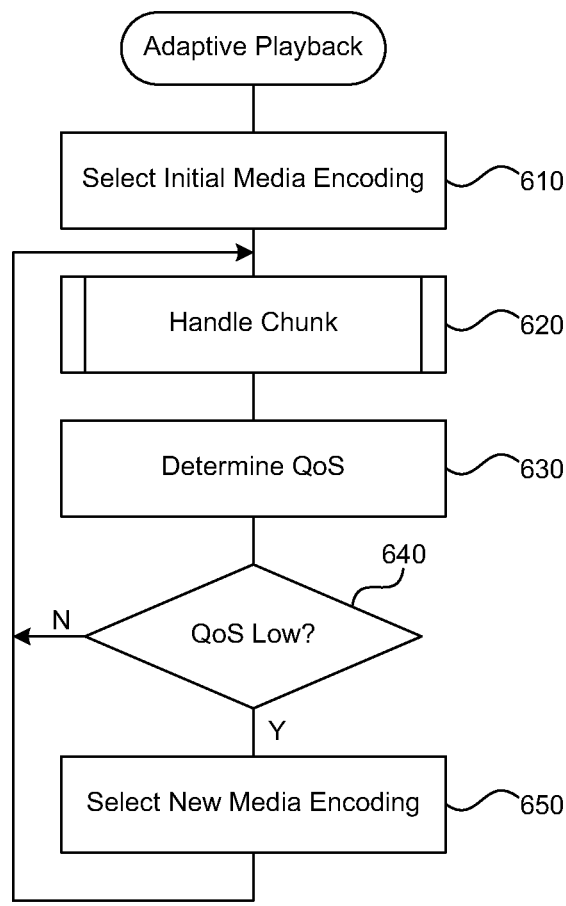
FIG. 6 is a flow diagram that illustrates the processing of the low latency streaming system on a client to playback media, in one embodiment.

FIG. 6 is a flow diagram that illustrates the processing of the low latency streaming system on a client to playback media, in one embodiment. Beginning in block 610, the system selects an initial encoding at which to request encoded media from the server. For example, the system may initially select a lowest available bit rate. The system may have previously sent a request to the server to discover the available bit rates and other available encodings. Continuing in block 620, the system requests and plays a particular chunk of the media, as described further with reference to FIG. 7. Continuing in block 630, the system determines a quality of service metric based on the requested chunk. For example, the chunk may include metadata for as many additional chunks as the server is currently storing, which the client can use to determine how fast the client is requesting chunks relative to how fast the server is producing chunks. This process is described in further detail herein.

Continuing in decision block 640, if the system determines that the current QoS metric is too low and the client connection to the server cannot handle the current encoding, then the system continues at block 650, else the system loops to block 620 to handle the next chunk. Continuing in block 650, the system selects a different encoding of the media, wherein the system selects a different encoding by requesting data from a different URL for subsequent chunks from the server. For example, the system may select an encoding that consumes half the bandwidth of the current encoding. Likewise, the system may determine that the QoS metric indicates that the client can handle a higher bit rate encoding, and the client may request a higher bit rate for subsequent chunks. In this way, the client adjusts the bit rate up and down based on current conditions.

Although FIG. 6 illustrates the QoS determination as occurring after each chunk, those of ordinary skill in the art will recognize that other QoS implementations are common, such as waiting a fixed number of packets or chunks (e.g., every 10th packet) to make a QoS determination. After block 650, the system loops to block 620 to handle the next chunk if one is available or completes if no further media is available (not shown).

Figure 7:
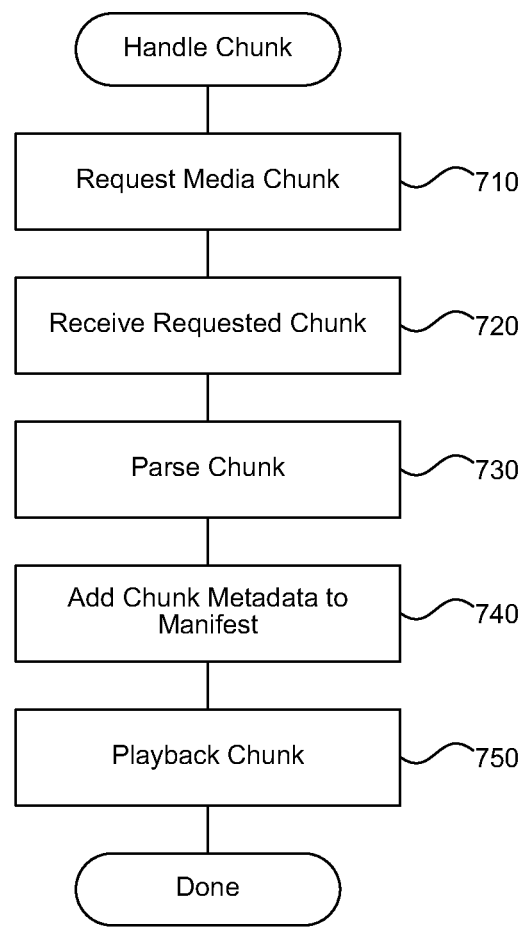
FIG. 7 is a flow diagram that illustrates the processing of the low latency streaming system to handle a single media chunk at a client, in one embodiment.

FIG. 7 is a flow diagram that illustrates the processing of the low latency streaming system to handle a single media chunk at a client, in one embodiment. Beginning in block 710, the system sends a request for a chunk from the client to a server over a network based on a selected initial bit rate. For example, the system may select a particular URL at which to request data based on the selected encoding (e.g., http://server/a.isml/quality/bitrate). Continuing in block 720, the system receives the requested chunk at the client. The system may receive the chunk from the server or from a cache between the server and the client on the network. Because each chunk is identified by its own stable URL, chunks can be cached by common Internet cache infrastructure. Continuing in block 730, the system parses the chunk into a metadata portion and a media data portion. For example, each chunk may contain metadata that describes the encoding of the chunk and media data suitable for playback using a codec and appropriate hardware.

Continuing in block 740, the system adds the chunk metadata to an ongoing media manifest that describes information about a larger media element to which each of the media data chunks belongs. For example, the system may store a manifest in memory that contains the metadata from each chunk of a media file. Continuing in block 750, the system plays the media data using a codec identified by the chunk metadata and hardware of the client. The media data may include video, audio, and other types of data that the system plays back on hardware including a display, speakers, and so forth. Alternatively or additionally, the data may include non-audiovisual data (e.g., text) that is consumed in some other way than playback, in which case the system acts on the data based on the type of data. After block 750, these steps conclude.

In some embodiments, the low latency streaming system provides a stream with more I-frames to improve startup time. Because a client can join at any point during a live streaming event, and because fragments may include less than a full GOP, the client may request its first fragment at a time when that fragment does not contain an I-frame. This may cause perceived latency from the viewing user's perspective, because the client cannot playback video until an I-frame is received. To reduce or eliminate this latency, the system may provide a stream that is encoded with a higher percentage of I-frames or even that is completely composed of I-frames. In this way, a client can initially request a fragment from this stream so that the client is assured of being able to quickly start playback of the media event. The client can then smoothly transition to a regular stream that consumes less bandwidth by using P-frames once playback is under way.

In some embodiments, the low latency streaming system uses the high I-frame stream for fast error recovery. For example, when a decoding error occurs on the client, the client can quickly switch to the high I-frame stream to get an I-frame and reset the decoder. The ability to request an I-frame at a particular point when needed allows the client to recover quickly without any handshake with the server. In addition, since multiple clients in a geographic region may experience similar packet loss or other network problems, it becomes more likely that caches near those clients will contain similar recovery data, so that the request for the high I-frame stream is more likely to come from a local cache than result in a server request.

In some embodiments, the low latency streaming system provides digital video recorder (DVR)-like functionality for live media streams. In other words, users can pause a live stream, seek within the live stream, and so forth, without adding work or state tracking for the server. In a live stream, there are several scenarios like a missed scene, a pause to take a break, joining the event late and intending to watch from start, and so forth that are enabled by the system allowing the user to play media fragments in various orders and at various times. Based on the assembled manifest described herein, the system offers the user control over how they watch a live stream. These controls are available today with TV via a DVR. The low latency streaming system includes client controls to respond to user actions and manage playback of a live stream in a non-live mode by seeking to various locations in the manifest and requesting the appropriate media fragments. In addition, the client can switch between live and non-live viewing during playback.

In some embodiments, the low latency streaming system operates by providing the client with a web browser plug-in. For example, the system may provide the client with a Microsoft Silverlight application. Microsoft Silverlight receives references in web pages to applications contained in containers called XAP files. Microsoft Silverlight extracts the XAP file and invokes the application. Microsoft Silverlight provides applications with a sandboxed, secure environment in which to run so that a user's computer system is protected from malicious or erroneous application code. Microsoft Silverlight provides application programming interfaces (APIs) that applications can call to playback media in a way that shields the user's computer system and hardware from potentially harmful application actions. Thus, Microsoft Silverlight and other browser plug-ins can provide all of the functionality of a client environment in which the low latency streaming system expects to operate.

In some embodiments, the low latency streaming system provides a plug-in model for heuristics to determine which encoding of media to use at a particular time. For example, the system may allow an administrator to select among several strategies for determining the bit rate at which to request media chunks based on a particular condition (e.g., reduced bandwidth or increased packet loss). In addition, content providers may include their own heuristics for determining the encoding to use, and may provide the heuristics as application modules or application dependency modules in an application package (e.g., a Microsoft Silverlight XAP) file that the client downloads when playing media from the content provider.

In some embodiments, the low latency streaming system stores the assembled manifest described herein for later use, such as playback the day after a live event. During a live event, the client may have requested chunks of various encodings based on the network conditions. The client browser may also contain these chunks in the browser's cache. If the user requests to play back the media later, it may be most efficient to attempt to play back the media from the local cache, which generally means that the client requests the exact same chunks that were originally played. By storing the manifest with metadata from each chunk that was actually received, the client can play the media back continuously using the same encodings that were requested previously. This may enable the user to watch the media in scenarios, such as an airplane, where connectivity to the origin server may be unavailable.

In some embodiments, the low latency streaming system provides logic for synchronizing related media streams. For example, a live audiovisual event may include one or more video streams (e.g., camera angles) and one or more audio streams (e.g., languages). As the client downloads the audio and video media fragments separately, the client plays the audio and video media content in sync by aligning the time information associated with each media fragment, as described further herein with reference to clock synchronization. The system may also synchronize other types of data, such as slides in a slide presentation, images, text, and so forth.

In some embodiments, the low latency streaming system provides streams that play at different rates to clients. For example, the server may include 2×, 5×, 0.5×, and other speeds of playback. The client can switch to a stream of a different rate to provide the appearance to the user that the media is fast-forwarding (e.g., 2×) or rewinding (e.g., 0.5×). To switch, the client simply requests a different media fragment, e.g., at a different URL. The client can smoothly switch between playing media fragments at the current rate and playing media fragments at a different rate by continuing to play the particular media fragments that are received. This provides a seamless experience to the end user with little latency between the user's request and the change in the media playback. This also saves network bandwidth as the client does not download, for example, two times the data to play media twice as fast, but rather downloads a reduced size encoding of the media that is encoded at the accelerated rate.

In some embodiments, the low latency streaming system provides highlight markers in the metadata. A highlight may include any interesting segment of media, such as a point during a sporting event during which a player scored a goal. The client can play a highlight reel after an event has concluded by playing those media fragments of the media with associated with highlight markers. If the client did not receive the live event, the client can request the manifest for the media and then request only those media fragments corresponding to the highlights. If a user wants to see more of the media before and after the highlight (e.g., as indicated by the user fast-forwarding or rewinding), then the client can request additional media fragments to play the requested portions of the media. Thus, the system may provide highlight information in the manifest for the client.

In some embodiments, the low latency streaming system supports inline advertising. For a live event, it may be unknown at the start of the event when commercial breaks will occur. An event coordinator may press a button during production when it is time for a commercial, causing the system to insert an advertising marker in the media stream metadata. When the client receives the advertising marker, the client may request and receive media fragments associated with a previously identified advertisement. For example, the system may provide a list of potential advertisements in an initial manifest. The advertisement may be provided in media fragments similar to other media, and may not be stored at the same server that provides the live event. Upon encountering an advertisement marker, the client pauses playback of the main stream, retrieves and displays the advertisement, and then resumes playback of the main stream.

In some embodiments, the low latency streaming system determines which encodings are available based on a subscription or other payment model. For example, a content provider may charge more for a high definition (HD) version of a live event than a standard definition (SD) version of the event. In this case, the system may enable or disable switching to particular bit rates based on whether the conditions of the payment model have been met (e.g., the user's account is current). This information may be included in the manifest provided to the client. The content provider may offer some encodings free, such as a low bit rate or highlight only media, while charging for others.

In some embodiments, the low latency streaming system provides failover for various components of the system. For example, the system may include redundant encoders, ingest servers, origin servers, and so forth. During an encoder failover, the server may append "StartTime(nnnn)" to the encoder URL where "nnnn" is the absolute timestamp of the last fragment the server successfully received. An example of the failover URL would be "http://encoder:port/StartTime (12345678)." When using MP4 boxes, the backup encoder does not need to resend the "ftyp," "ManifestBox," and "moov'" boxes when it starts the stream. If encoder failover caused missing fragments, the server will return "404—File Not Found" if those fragments are requested by the client.

The low latency streaming system may request and receive media content in a variety of encodings. In some embodiments, the low latency streaming system uses custom MP4 boxes. The Motion Picture Experts Group (MPEG) version 4 standard provides for boxes within the format that can contain custom data. The MP4 extension is the file format commonly associated with this version of content. The system may leverage boxes to include the custom metadata and media content chunks. Other media formats provide similar customization of content within a container and may be used by the system.

In some embodiments, the low latency streaming system conforms to the guidelines of the Representational State Transfer (REST) style of software architecture for distributed hypermedia systems. One concept in REST is that an application can interact with a resource by knowing only the identifier of the resource (e.g., a URI) and the action requested (e.g., retrieval), and without knowing whether there are caches, proxies, gateways, firewalls, tunnels, or anything else between the application and the server actually holding the information. Following REST guidelines allows the system to benefit from existing Internet infrastructure and pre-existing resource conserving techniques such as caching. Some example REST-full principles that the system implements in some embodiments include: each URI identifies exactly one response, each URI points to a server resource that is stateless and cacheable, and each URI is intuitive and uses nouns (verbs are HTTP verbs). In particular, the system may avoid making requests using query strings and may use substantially unique keys for start times that are requested via URLs.

From the foregoing, it will be appreciated that specific embodiments of the low latency streaming system have been described herein for purposes of illustration, but that various modifications may be made without deviating from the spirit and scope of the invention. For example, although audiovisual data has been used in examples, other types of data can be used with the system including text (e.g., streaming stock quotes), slides (e.g., a presentation), and so forth. Accordingly, the invention is not limited except as by the appended claims.

We claim:

1. A computer-implemented method for receiving encoded media fragments from one or more encoders, the method comprising:

sending encoder configuration information to one or more encoders that includes parameters to reduce latency for one or more clients watching a live event encoded by the one or more encoders;

requesting a media manifest from each registered encoder that describes the media data available from the encoder;

receiving an encoder manifest from each encoder that describes one or more parameters of the encoder;

receiving a media fragment from an encoder;

indexing the received media fragment and adding the index information to an index table that catalogs the available media fragments;

archiving the received media fragment by storing the fragment and index information in a data store from which the fragment and index information can later be retrieved to satisfy client requests; and building a server manifest that includes information regarding a media event of which the media fragments are a part by adding information regarding the received fragment to the manifest, wherein the preceding steps are performed by at least one processor.

2. The method of claim 1 wherein the encoder configuration information includes a parameter that requests that the encoders encode video without bidirectionally encoded frames (B-frames).

3. The method of claim 1 wherein the encoder configuration information includes a parameter that requests that the encoders create fragments with less than a full group of pictures (GOP).

4. The method of claim 1 wherein the encoder configuration information includes a parameter that requests that the encoders create fragments with a predetermined number of frames.

5. The method of claim 1 wherein the encoder configuration information includes a parameter that requests that the encoders create a fast start stream that includes more intraframes (I-frames) than at least one other stream.

6. The method of claim 1 wherein indexing the received media fragment includes identifying a time of an preceding fragment so that the received media fragment can be provided in response to a next fragment request from a client that references the preceding fragment.

7. The method of claim 1 wherein the received media fragment includes a timestamp that correlates media fragments produced in parallel by different encoders and an identifier of the encoder that encoded the media fragment.

8. The method of claim 1 further comprising, for each received encoder manifest, merging the manifests of the encoders together and storing the merged manifest for later retrieval by clients to identify the media encodings that the system can provide.

9. A computer system for delivering low latency cacheable streaming media presentations, the system comprising:

a processor and memory configured to execute software instructions;

a register event component configured to receive information regarding a live media event for which the system will receive encoded media data and provide the encoded media data to one or more clients watching the encoded live media event;

an encoder interface component configured to provide an interface between the system and one or more encoders that provide the encoded media data as media fragments;

an index fragment component configured to create and maintain an index table of media fragments received from encoders;

a fragment data store configured to store received media fragments and the created index table of fragments to provide to clients based on received client requests;

a client interface component configured to receive client requests for media fragments and provide manifest data and media fragments to clients;

a build client manifest component configured to build a manifest to satisfy a client request that includes information regarding each of the encodings available from the system and fragments stored by the system up to a time of the request; and a clock synchronization component configured to synchronize the clocks of the system, clients, and encoders.

10. The system of claim 9 wherein the encoder interface component is further configured to send encoder configuration information to encoders that specifies parameters for reducing latency.

11. The system of claim 9 wherein the encoder interface component is further configured to send to an encoder configuration information that specifies encoding without bidirectionally encoded frames (B-frames).

12. The system of claim 9 wherein the encoder interface component is further configured to send to an encoder configuration information that specifies encoding with less than a full group of pictures (GOP) in each fragment created by the encoder.

13. The system of claim 9 wherein the encoder interface component is further configured to send to an encoder configuration information that specifies a number of frames to include in each fragment created by the encoder.

14. The system of claim 9 wherein the client interface component is further configured to receive client requests for media fragments wherein the requests identify a fragment by referencing a preceding fragment.

15. The system of claim 9 wherein the client interface component is further configured to receive client requests for media fragments wherein the requests identify a fragment by specifying a time associated with a previous fragment.

16. A computer-readable storage device comprising instructions for controlling a computer system to playback media on a client with low latency, wherein the instructions, when executed, cause a processor to perform actions comprising:

sending from the client a request for a chunk of media to a server over a network related to a live media event to be watched at the client, wherein the chunk comprises a uniform portion of the media available from the server to multiple clients;

receiving at the client the requested chunk;

parsing the chunk into a metadata portion and a media data portion;

adding the chunk metadata to an ongoing media manifest that describes information regarding a larger media element to which the media chunk belongs; and playing the media data using a codec identified by the chunk metadata and hardware of the client.

17. The device of claim 16 wherein the request includes an indication that the client is request a chunk following a chunk previous received by the client.

18. The device of claim 16 wherein the received chunk contains no bidirectionally encoded frames (B-frames).

19. The device of claim 16 wherein the client plays the media data with lower latency without using a decoding buffer for decoding bidirectionally encoded frames (B-frames).

20. The device of claim 16 wherein playing the media data comprises combining data in a chunk without an intraframe (I-frame) with data in a chunk with an intraframe (I-frame).

* * * * *